United States Patent
Dorsch et al.

(10) Patent No.: US 7,033,022 B2
(45) Date of Patent: Apr. 25, 2006

(54) PROGRESSIVE SPECTACLE LENS FOR SEEING OBJECTS AT A LARGE OR AVERAGE DISTANCE

(75) Inventors: Rainer Dorsch, Munich (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 57 days.

(21) Appl. No.: 10/416,725

(22) PCT Filed: Nov. 28, 2001

(86) PCT No.: PCT/DE01/04441

§ 371 (c)(1),
(2), (4) Date: Nov. 26, 2003

(87) PCT Pub. No.: WO02/44792

PCT Pub. Date: Jun. 6, 2002

(65) Prior Publication Data
US 2004/0095553 A1 May 20, 2004

(30) Foreign Application Priority Data
Nov. 28, 2000 (DE) ......................... 100 59 023

(51) Int. Cl.
*G02C 7/06* (2006.01)

(52) U.S. Cl. ....................................... 351/169
(58) Field of Classification Search ................ 351/168, 351/169, 170, 171, 172
See application file for complete search history.

(56) References Cited

U.S. PATENT DOCUMENTS 3,687,528 A    8/1972  Maitenaz 5,479,220 A    12/1995 Komatsu et al.
5,708,492 A    1/1998  Kitani
5,861,935 A *  1/1999  Morris et al. ............... 351/169

FOREIGN PATENT DOCUMENTS

| DE | 2044639 | 3/1971 |
| FR | 2 744 534 | 8/1997 |
| WO | 97/40415 | 10/1997 |

OTHER PUBLICATIONS

Guilino, G.H.: *Design Philosophy for Progressive Addition Lenses*, Applied Optics, Optical Society of America, vol. 32, No. 1 (1993).

International Search Report.

* cited by examiner

Primary Examiner—Scott J. Sugarman
(74) Attorney, Agent, or Firm—Crowell & Moring LLP

(57) ABSTRACT

A spectacle lens having in a first see-through region a power suitable for distant viewing in a wearing position, and in a second see-through region a power suitable for medium-distance viewing, i.e. for distances of about 1 meter and more, in a wearing position, and in which the power continuously increases from the first see-through region along a plane or winding principal line to the second see-through region. The spectacle lens has the following features: the power increases not only from the first see-through region to the second see-through region, but also continuously to beyond the second see-through region to a lower edge of the spectacle lens; and a region of clear vision, i.e. a region in which a residual astigmatism of a system spectacle-lens/eye does not exceed 0.5 dpt, narrows below the first see-through region towards the lower edge of the spectacle lens to have a funnel-shaped configuration, i.e. without any constriction.

32 Claims, 5 Drawing Sheets

PROGRESSIVE SPECTACLE LENS FOR SEEING OBJECTS AT A LARGE OR AVERAGE DISTANCE

TECHNICAL FIELD

The invention relates to a progressive spectacle lens for large and medium object distances.

PRIOR ART

Progressive spectacle lenses (also called varifocal lenses, multifocal lenses etc.) are usually understood to be spectacle lenses having a different (smaller) power in a region through which a spectacles wearer views an object located at a large distance—hereunder designated as a distance portion—than in a region (near portion) through which the spectacles wearer views a near object. Situated between the distance portion and the near portion is a so-called progressive zone in which the power of a spectacle lens continuously increases from that of the distance portion to that of the near portion. The magnitude of the power increase is also designated as addition power.

As a rule, the distance portion is situated in the upper part of the spectacle lens and designed for viewing "to infinity", whilst the near portion is situated in the lower region and is particularly designed for reading. In spectacles for special applications—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, for the power to increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the principal curvatures K1=1/R1 and K2=1/R2 are given instead of the principal radii of curvature.) Together with the refractive index of the glass material, the principal radii of curvature govern the parameters frequently used for an ophthalmologic characterization of a surface:

Surface power $D=0.5 \cdot (n-1) \cdot (1/R1+1/R2)$

Surface astigmatism $A=(n-1) \cdot (1/R1-1/R2)$

The surface power D is the parameter via which an increase of power from th distance portion to the near portion is achieved. The surface astigmatism A (more clearly termed cylinder power) is a "disturbing property"— inasmuch as it does not serve correction purposes—because a residual astigmatism of the system eye/spectacle lens exceeding a value of about 0.5 dpt results in an indistinctly perceived image on the retina.

Although any change of the curvature of the surface(s) which is needed to achieve a surface power increase without vision being "disturbed" by surface astigmatism can be attained relatively simply along a (plane or winding) line, considerable "intersections" of surfaces will occur alongside this line, leading to a large surface astigmatism which more or less impairs the lens in regions alongside the mentioned line. According to the Minkwitz' Proposition, for a line lying in a plane and designed as a umbilical line, the surface astigmatism in the direction perpendicular to the umbilical line increases with a gradient which is twice that of the surface power along the umbilical line, so that disturbing values of the surface astigmatism will already occur close to the umbilical line, particularly in the progressive zone. (A line which has the same principal curvatures at every point, i.e. which is free of surface astigmatism, is termed a navel line or ombilical line).

With known progressive spectacle lenses in which one region is designed for distant viewing (distance portion), and the other region is designed for near viewing, i.e. for distances of about 33 to 45 cm (near portion), a region of clear vision commencing at the distance portion in the so-called progressive zone narrows down to a width of a few millimeters, typically 2 to 3 mm in prior art, and then widens to a width of typically more than 7 mm in an upper region of the near portion. Thus, with progressive spectacle lenses of prior art, the region of clear vision has a shape similar to that of an hour glass (which is narrow at bottom). This also applies to the progressive spectacle lens known from WO 97/40415 in which the lower region of clear vision is designed for medium-distance viewing.

A constriction of the region of clear vision in the progressive zone, i.e. in the region between the distance portion and the lower region of clear vision (near portion) is of special hindrance particularly when the spectacles wearer, because of his activities, does not use the near portion (designed for viewing distances of about 30 to about 40 cm) but merely looks into large or medium distances of typically up to 1 meter or slightly less. As examples of such activities will be mentioned the playing of tennis, football or golf or a monitoring of activities.

DESCRIPTION OF THE INVENTION

The invention is based on the object of providing a progressive spectacle lens in which a region of clear vision is so large, not only in a distance portion but also in a portion which is designed for viewing at medium distances up to about 1 meter, that it renders a distinct observation of a large field of view possible without any movement of the head.

An achievement of this object in accordance with the invention is set out in patent claim 1. Further developments of the invention are the subject matter of claim 2 and the subsequent claims.

The invention sets out from a realization of the following:

There are a series of cases of application or activities which explicitly exclude any requirements of near viewing, or in which any requirements of viewing at very small distances (of less than 1 m to about 33 cm) are subordinate. Spectacle wearers desiring to have spectacles for these cases of application or activities can be provided with spectacle lenses in accordance with the invention, which (substantially) make possible only a correction of acuity of vision in the distance portion and in the intermediate portion, but which have properties, particularly in the intermediate region, which are superior in comparison with those of conventional progressive spectacle lenses.

Therefore, according to the invention a spectacle lens is provided, having in a wearing position and in a first see-through region a power suitable for viewing at a distance, and in a wearing position and in a second see-through region a power suitable for viewing at medium distances, i.e. for distances of about one meter and more. With this, the power increases continuously from the first see-through region along a plane or winding principal line (principal meridian) to the second see-through region.

For this, the term "power in a wearing position", as used in the present application, designates the optical power of the spectacle lens in the so-called wearing position: this power in a wearing position may be computed in the same way as the residual astigmatism of the system spectacle-lens/eye, for example by means of a calculation of rays for a spectacle lens disposed in front of an eye at a particular distance and at a particular pantoscopic angle. For this, the eye is presupposed to be a normal eye together with respective prescription data—such as any necessary spherical correction, any possible astigmatism and any cylinder axis of the astigmatism of the eye. Movements of the eye may be taken account of in known manner, for example according to the so-called Listing's Rule. In the same way, any residual accommodation ability that is present is taken into account by specifying an assignment of a particular object distance to a particular power increase. This assignment then determines also the displacement of a winding principal line or the angle at which a plane principal line will extend relative to the vertical, in order that the principal line (principal meridian) will follow the convergence of the rays of sight when viewing at a particular distance is performed.

In addition to the surface data of the front and eye-side surfaces of a spectacle lens, the thickness of the spectacle lens, the refractive index and any prismatic power, and also the already-mentioned arrangement of the spectacle lens relative to the eye govern the power in a wearing position and the residual astigmatism of the system spectacle-lens/eye, wherein of course the progressive properties of the spectacle lens in the wearing position are substantially determined by the design, i.e. by the surface properties of the progressive surface(s). In the same way, the surface astigmatism values of the progressive surface substantially determine the residual astigmatism of the system spectacle-lens/(eye.

Computation of the power in a wearing position, and of the residual astigmatism of the system spectacle-lens/eye for an astigmatic or non-astigmatic eye, is known from the literature. Computing programs enabling this computation are commercially available.

In accordance with the invention, the power is chosen to vary so that it increases continuously not only from the first see-through region to the second see-through region, but also beyond the second see-through region as far as the lower edge of the spectacle lens. As distinct from conventional progressive spectacle lenses in which the region of clear vision is shaped like an hour-glass, the spectacle lens according to the invention has a region of clear vision, i.e. a region in which a residual astigmatism of the system spectacle-lens/eye does not exceed 0.5 dpt, which is shaped to become narrow like a funnel, i.e. without any constriction, below the first region of clear vision and as far as the lower edge of the spectacle lens. Because of this, the region of clear vision, particularly for viewing distances of two meters and below, i.e. in particular up to 1 m, is very wide: typically it is wider than in very good conventional spectacle lenses for the same viewing distance by a factor of at least two. Above all, the funnel-shape of the region of clear vision is physiologically better than the conventional shape, and it needs less becoming used to, because a spectacles wearer need not accept a narrowing of the region of clear vision at medium distances and a widening at short distances. The funnel-shape is also more suited to a typical wearing situation, because normally an area which a spectacles wearer desires to perceive distinctly without moving the head and only with a movement of the eye also becomes larger with increasing distance.

Of course, it is possible for both surfaces of a spectacle lens to contribute to an increase of power in the wearing position; however, as a rule it is sufficient for only one of the two surfaces, for example the eye side surface, to contribute to the increase of the power by a suitable change of its surface power.

In this case, the other surface may be a rotationally symmetrical—spherical or non-spherical—or a toroidal surface, wherein one or both principal meridians of the toroidal surface may have a shape which differs from a spherical shape.

However, it is particularly preferred when the surface(s) contributing to the power increase in the wearing position has (have) been individually computed for the particular wearing situation. For this, not only the typical parameters of an individualized surface—interpupillary distance, vertex distance, pantoscopic angle etc.—may enter into the computation of the progressive surface in the wearing position, but also the specific situation in which the spectacles wearer intends to use the spectacle lens. In this, account must be taken particularly of the minimum distance at which the spectacles wearer must still be able to see distinctly without any accommodation; this distance may well differ on the high side from the approximate lower limit of about 1 m as specified in claim 1. According to the situation of use—the first see-through region may not be designed for a distance of "infinity", but for a shorter distance, for example several meters.

In the case of individually computed progressive surfaces it is furthermore preferred for these also to provide any astigmatism needed for correcting an astigmatism of the eye. The other surface—which preferably is the front surface—may then be a rotationally symmetrical surface; for decreasing the thickness of a spectacle lens, or for fitting it into specifically shaped frames, the other surface—which then is particularly preferred to be the front surface—may also be of toroidal shape, the astigmatism of which however does not serve primarily to correct an astigmatism of an eye. An astigmatism caused by a second surface, the shape of which has been selected according to aesthetic considerations, is then compensated by the individually computed progressive surface.

In the case of a non-astigmatic eye and powers which are not too large, the region of clear vision is (substantially) bounded by an 0.5 dpt isometric line of the surface astigmatism of the progressive surface, which then practically coincides with an 0.5 dpt isometric line of the residual astigmatism of the system eye/spectacle-lens.

With an especially preferred example of embodiment of the spectacle lens according to the invention, the course of the first differential of the power along the principal line between the first and the second see-through regions is monotonous, and with a further development it is also monotonous along the principal line between the second see-through region and the lower edge of the spectacle lens Because of this course of the first differential of the power it is particularly easy to achieve the funnel shape of the region of clear vision without any constriction.

The design, in accordance with the invention, of the spectacle lens is therefore not comparable with that of the spectacle lens known particularly from FIG. 3 of DE 20 44 639 A1: this known spectacle lens has at a point A3 a power which is so large that distinct viewing is not possible at medium distances, but merely at distances of 0.5 m (without accommodation) or less (with accommodation). Furthermore, with this known spectacle lens, as evidenced by FIG. 17, the addition power again becomes smaller below the point A3. The same correspondingly applies to the spectacle lens known from FIG. 4 of the article "Design Philosophy for Progressive Addition Lenses" by Günther H. Guilino, published in Applied Optics, Vol. 32, No. 1, Page 111ff. Moreover, it must be pointed out that the mentioned references describe surface properties and no properties in a position of use.

Furthermore, the spectacle lens according to the invention can have the same diameter as a conventional spectacle lens with progressive power.

BRIEF DESCRIPTION OF THE DRAWINGS

In the following the invention will be described by way of example with the aid of an example of embodiment and with reference to the drawings in which.

DESCRIPTION OF AN EXAMPLE OF EMBODIMENT

The partial Figures "a" of FIGS. 1 to 4 always show the parameters, as explained in detail hereunder, for a spectacle lens according to the invention, whilst the partial Figures "b" show by way of comparison the corresponding parameters for a progressive spectacle lens of prior art, i.e. a spectacle lens having a distance portion, a near portion, and a progressive zone disposed in between As the partial Figures "a" and "b" of the respective Figure correspond to each other, reference is made to the description of the corresponding partial Figure "a" for an explanation of the respective partial Figure "b".

For the illustrated example of embodiment and for the progressive spectacle lens according to prior art as used for a comparison, the following prerequisites or initial conditions will apply without any limitation of the generality.

In the design of both spectacle lenses it will be assumed that the spectacles wearer is completely presbyopic, i.e. no longer has any ability to accommodate. The basic concept of the invention is, of course, also applicable to spectacle lenses which are intended for spectacles wearers having a residual ability to accommodate.

Figure 1A:
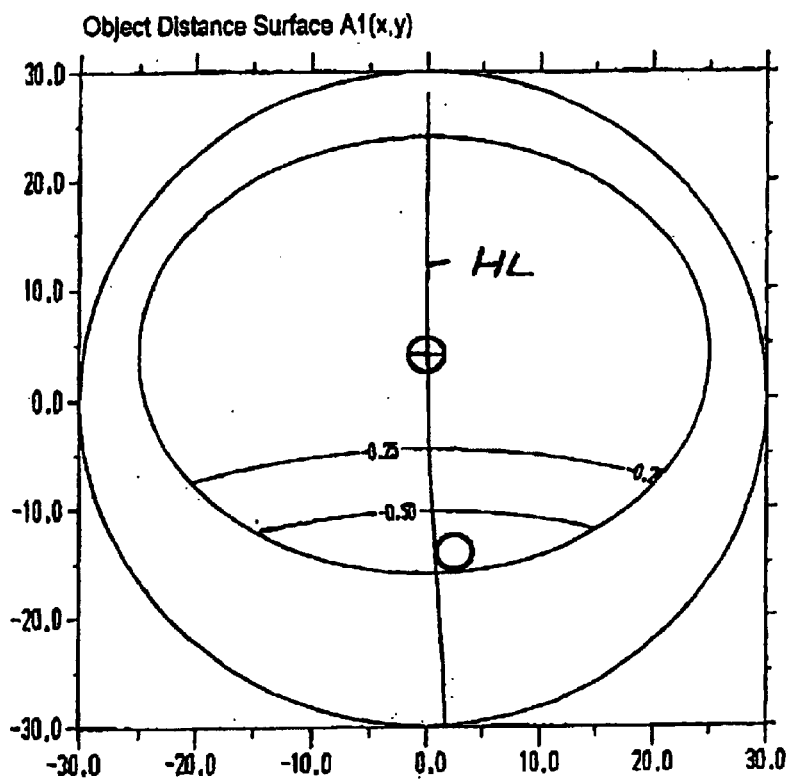
FIG. 1a shows the so-called object distance surface for an example of embodiment of a spectacle lens according to the invention.
Figure 1B:
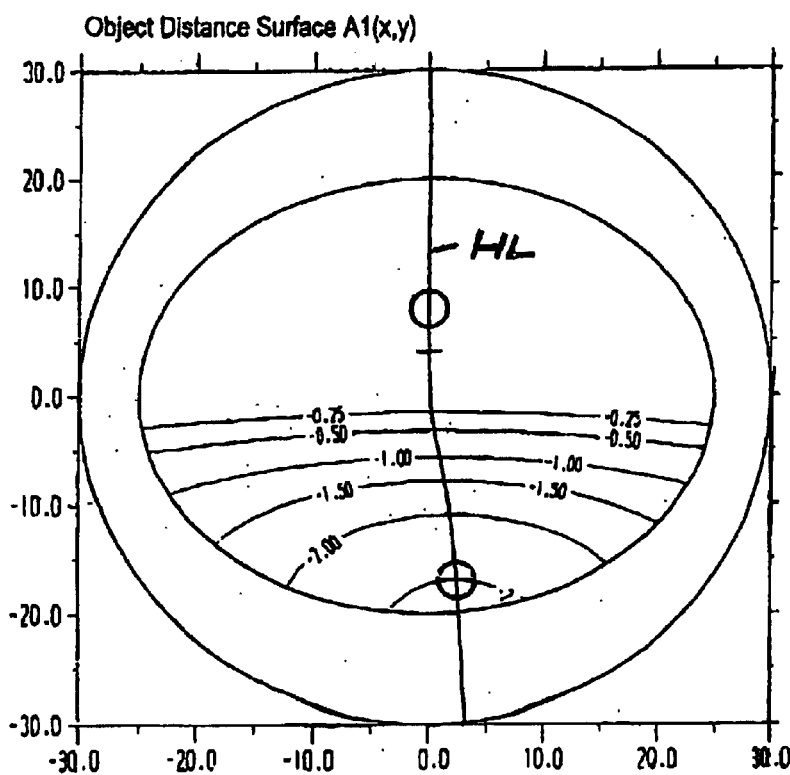
FIG. 1b shows by way of comparison the so-called object distance surface for a conventional progressive spectacle lens.

The "uncut" round spectacle lenses have a diameter of 60 mm the outer border of the uncut round spectacle lens and also that of a typically edged spectacle lens are shown in FIGS. 1 to 3. Of course, even greater or smaller diameters and other edge shapes are possible according to the shape of a spectacles frame which has been chosen and is subject to fashion trends as far as size and shape are concerned.

The scales on the abscissa (x coordinate) and the ordinate (y coordinate) of FIGS. 1 to 3 are each given in millimeters. For this, the coordinate system is chosen to be in the wearing position, i.e. in the position in which the spectacle lens is located in front of an eye.

In all of the FIGS. 1 to 3 the distance reference point $B_F$ (y>0) and the near reference point $B_N$ (y<0) are denoted by double rings or circles—in each case according to DIN or ISO Standards—or else the reference point "$B_N$" for the second see-through region, which is stamp-marked on the spectacle lens of the invention and formally corresponds to the usual Standard values, is given.

A cross denotes the centration point $Z_P$. For an explanation of these terms reference may be made to the relevant Standards.

For the illustrated example of embodiment of the spectacle lens according to the invention the distance reference point $B_F$ and the centration point $Z_P$ coincide.

Furthermore, FIGS. 1 to 3 show the assumed principal visual axis or principal line HL on which the computation of the spectacle lens is based. This means that a particular convergence of the eyes is assigned to a particular lowering of the glance. This assignment, or a correlation between a lowering of the glance and a convergence, is different for a spectacle lens according to the invention and a progressive spectacle lens known from prior art!

Of course, the invention is not limited to the correlation, shown in FIG. 1a by way of example, between a lowering of the glance and a convergence of the eyes.

The mutual assignment of a lowering of the glance and a convergence leads to a distance between the intersection point of the axes of the eyes and the vertex of the pupils for every lowering of the glance. To this distance may be assigned an accommodation (in dpt, i.e. $m^{-1}$) which is necessary for an object located at this distance in front of the eyes to be seen distinctly.

FIG. 1 show the so-called object distance surfaces for a spectacle lens according to the invention (partial Fig. a) and a conventional progressive spectacle lens (partial Fig. b), which result from the correlation, as assumed in each case, between a lowering of the glance and a convergence of the eyes for an object which is located directly in front of the nose or laterally displaced.

With the spectacle lens according to the invention, as shown in FIG. 1a, the object distance at the reference point, located at y=−14 mm, of the second see-through region, which corresponds to the near reference point $B_N$ of a conventional progressive spectacle lens, is set to 1.30 m. For this distance the necessary accommodation is 1/1.30=0.77 dpt.

The isometric lines indicate the object distances for each of which the necessary accommodation is 0.25 dpt and 0.5 dpt.

It is pointed out merely for the sake of order that with the spectacle lens of the invention the reference point for the second see-through region is indicated in accordance with relevant Standards or rules, so that the principal visual axis which has been taken as a basis does not pass through the mark for the reference point $B_N$, as stamped on the spectacle lens.

For the progressive spectacle lens according to prior art, which has been used for comparison, the "design distance" at the near reference point is 33 cm, so that the necessary accommodation is 3 dpt.

The spectacle lens of the invention, described by way of example and illustrated in greater detail in FIGS. 2a to 4a, has been computed on the basis of the object distance surface specified according to FIG. 1a.

Figure 2A:
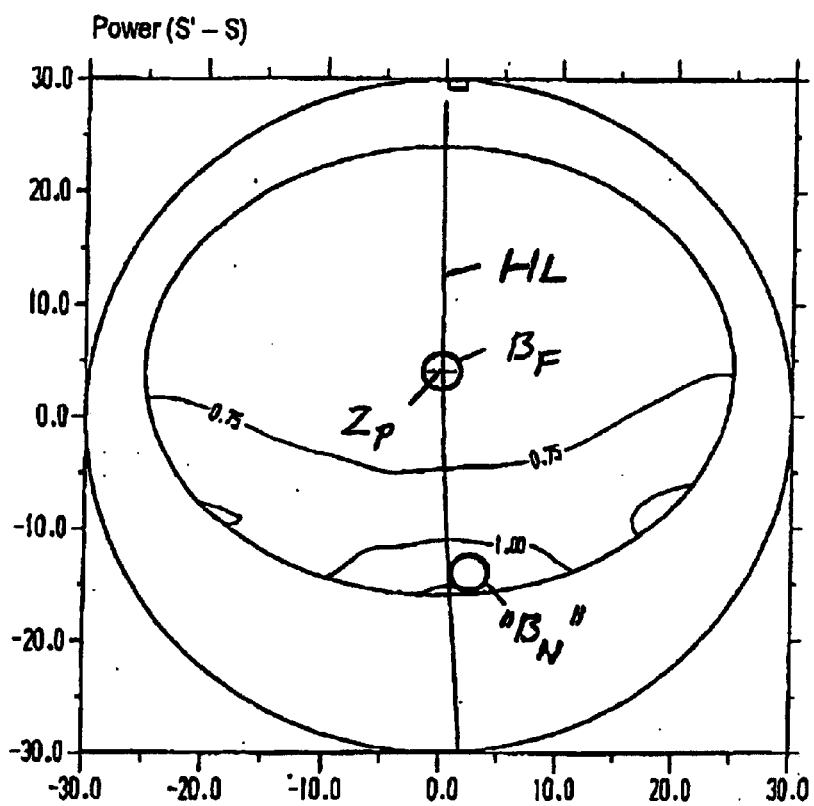
FIG. 2a shows the isometric lines of the increase of the power in the wearing position for a spectacle lens according to the invention.

FIG. 2a shows as an isometric line representation the increase (S'–S) of the power (in dpt) in a wearing position. In this, S' is the reciprocal of the image side focal length in a wearing position, and S is the reciprocal of the object side focal length.

It may be seen from FIG. 2 that the isometric lines of the power increase in the region of the principal visual axis extend approximately horizontally and therefore in a physiologically advantageous manner. Moreover, the isometric lines of the power increase which pass through the principal line above the center between the points BF and "BN" are curved upwardly laterally of the principal line and reach the edge of the spectacle lens at a value of the y coordinate which is larger than that of the y coordinate at which they pass through the principal line.

Figure 2B:
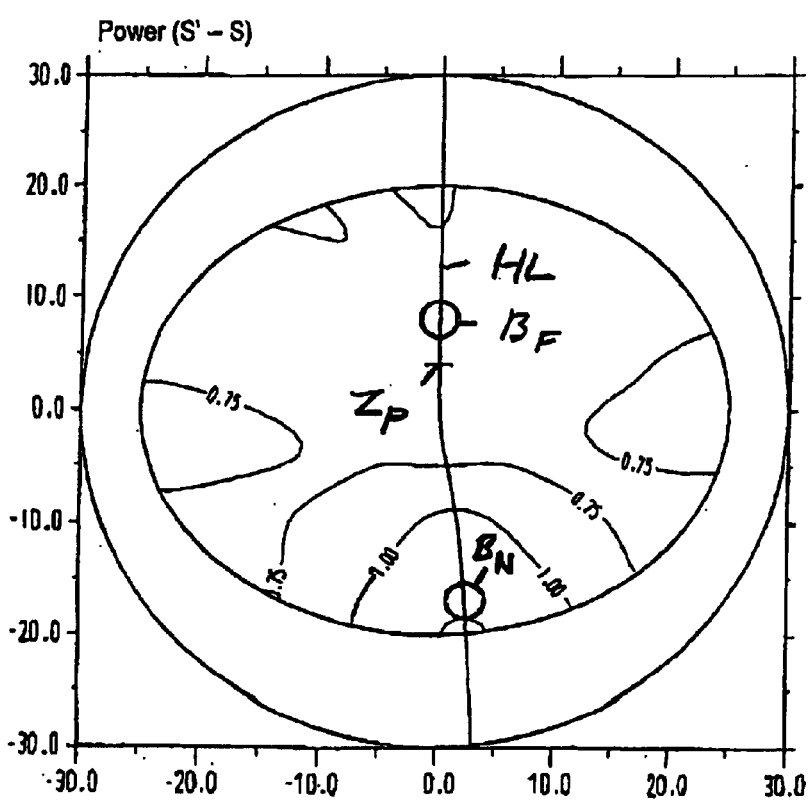
FIG. 2b shows by way of comparison the corresponding isometric lines for a conventional progressive spectacle lens.

FIG. 2b shows, also as an isometric line illustration, the increase of the power in a wearing position for a conventional progressive spectacle lens.

From a comparison of the FIGS. 2a and 2b it becomes immediately evident that for the conventional spectacle lens the isometric line 0.75 is substantially more "rugged" than for the spectacle lens according to the invention. Above all, however, the 0.75 dpt isometric line for the spectacle lens of the invention extends upwards laterally of the principal line, whilst it is curved downwards in the case of the prior art. The 1.0 dpt isometric line is curved downwards substantially more than with the spectacle lens according to the invention.

Figure 3A:
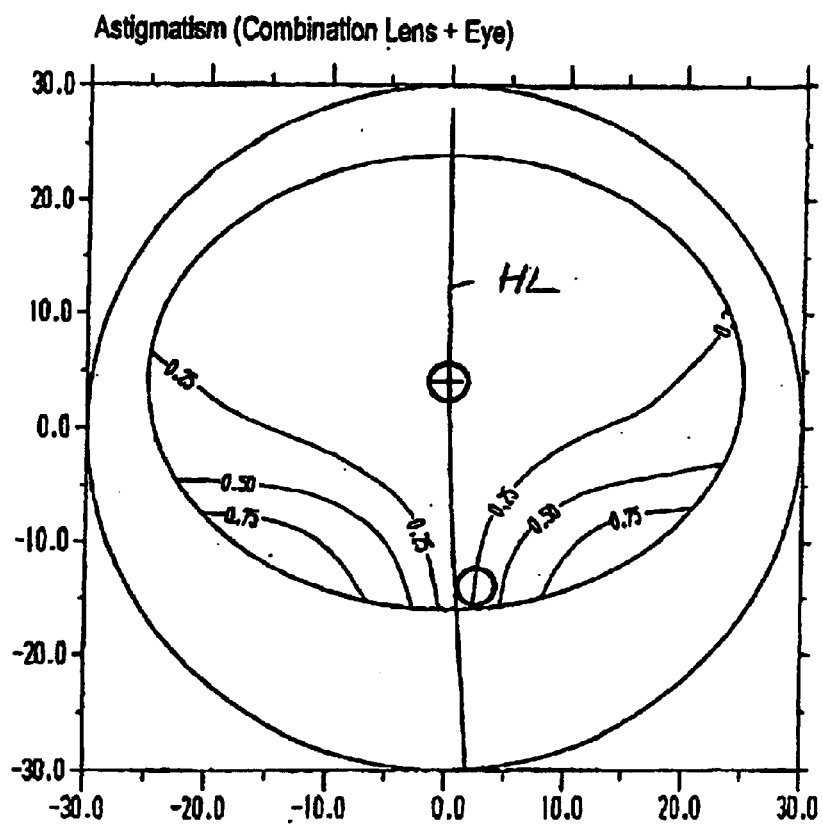
FIG. 3a shows the isometric lines of the resulting astigmatism of the system eye/spectacle-lens for a spectacle lens according to the invention.

FIG. 3a shows an isometric line illustration of the course of the lines of equal (residual) astigmatism of the system spectacle-lens/eye. The corresponding illustration for a conventional progressive spectacle lens is shown by FIG. 3b.

Figure 3B:
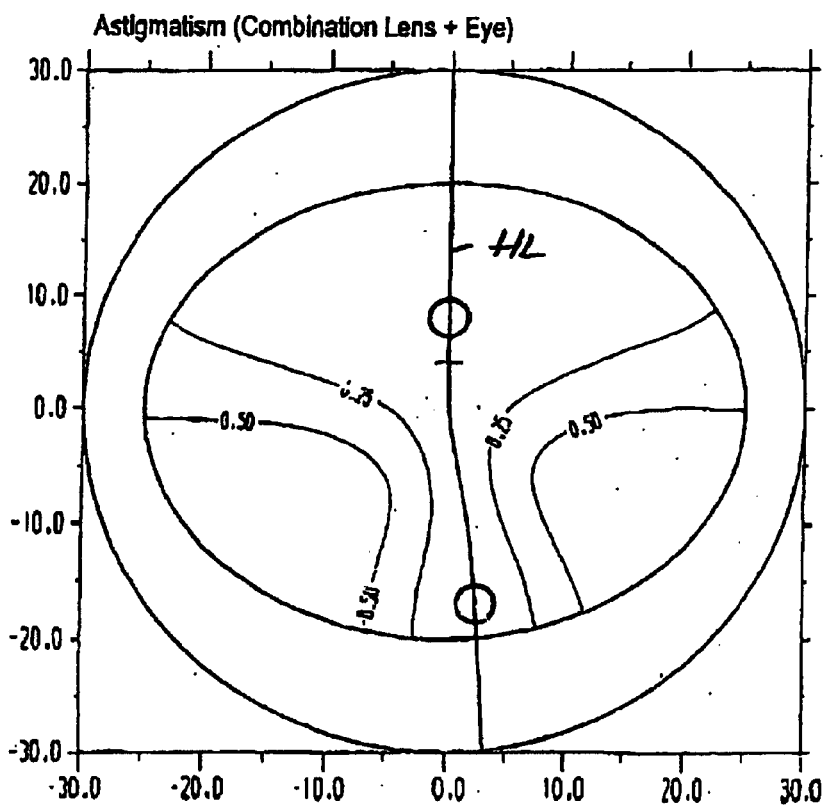
FIG. 3b shows by way of comparison the corresponding isometric lines for a conventional progressive spectacle lens.

From a comparison of these Figures it can be seen that with the spectacle lens of the invention (FIG. 3a) the isometric lines for an astigmatism of 0.25 and 0.5 dpt "run towards" the principal visual axis only at significantly lower object distances than in the prior art, so that for a lowering of the glance for intermediate object distances the region of undisturbed viewing, or the region of clear vision is significantly wider than with the conventional spectacle lens according to FIG. 3b. Furthermore, the course of the isometric lines exhibits no reversal, i.e. the region of clear vision is funnel-shaped and not shaped like an "hour glass".

Figure 4A:
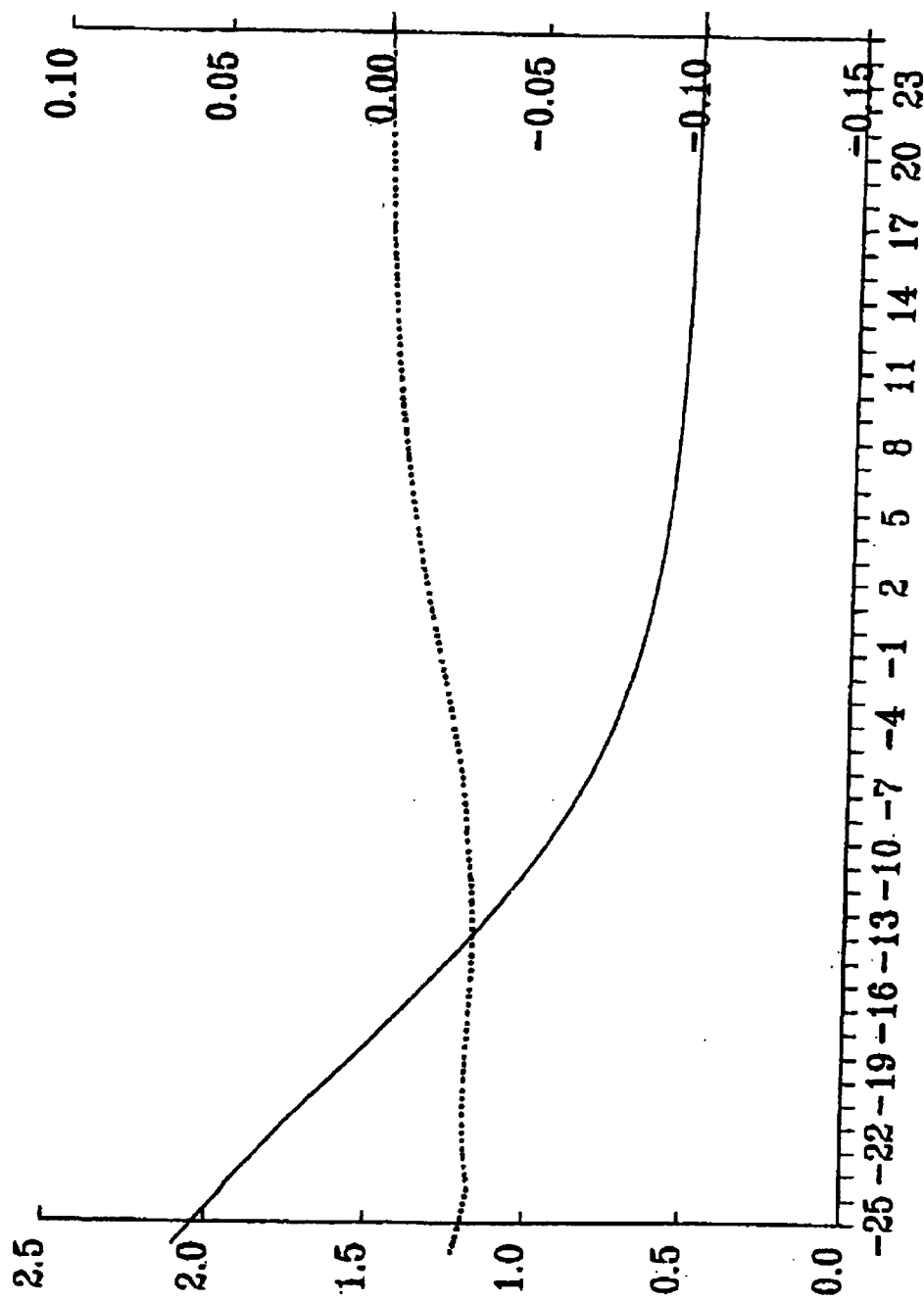
FIG. 4a shows the variation of the power in the wearing position and also the first derivative of the power along the principal meridian.
Figure 4B:
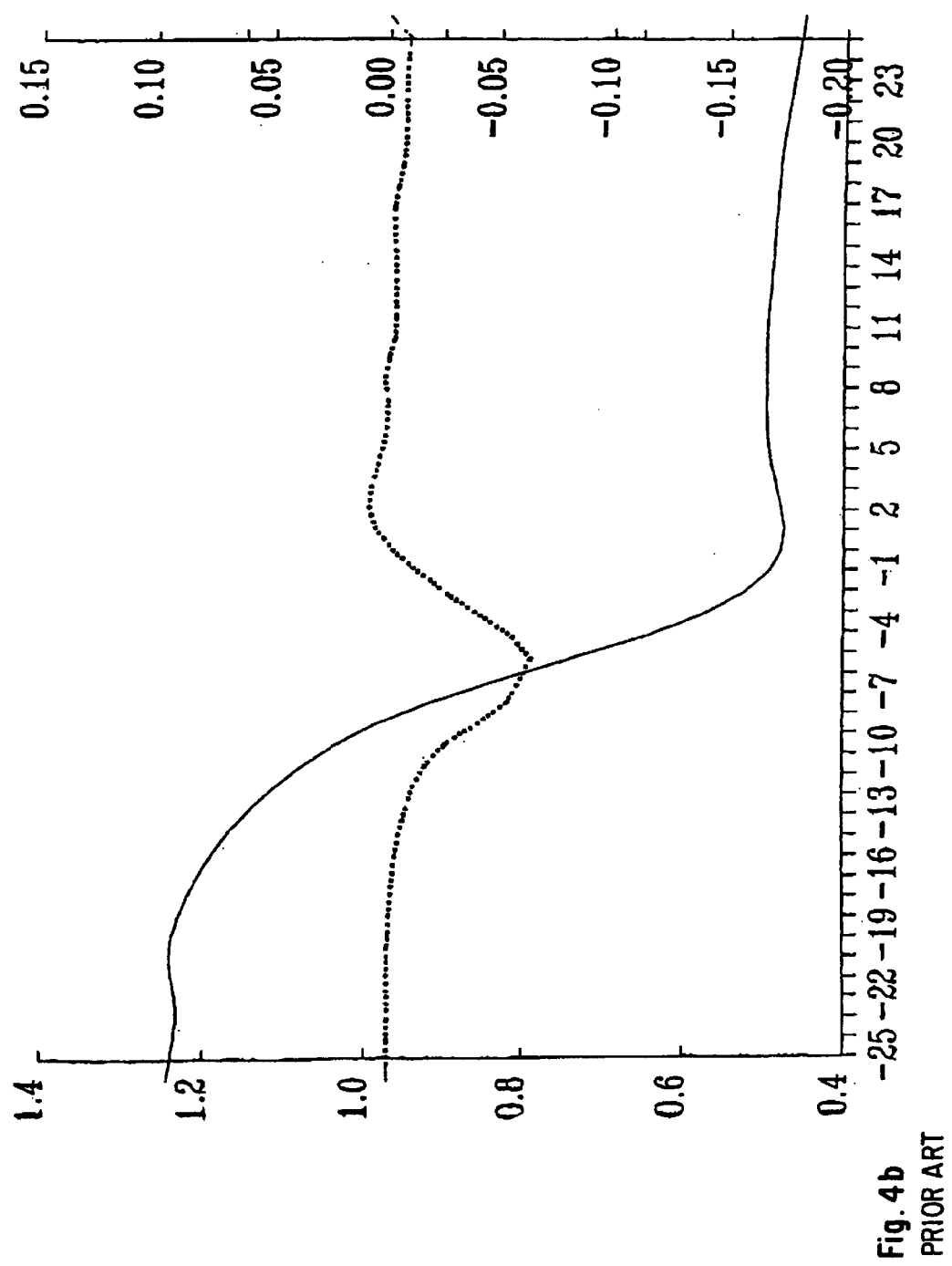
FIG. 4b shows by way of comparison the corresponding variation for a conventional progressive spectacle lens.

FIG. 4a shows the course of the power in a wearing position (solid line) and the first derivative of the power along the principal line (dotted line) or the principal meridian for a spectacle lens of the invention. From FIG. 4 it may be seen that the course of the first derivative of the power is monotonous between the distance reference point and the lower edge of the spectacle lens. With prior art (FIG. 4b) however, the first derivative exhibits a non-monotonous course which is responsible particularly for the constriction occurring in the prior art.

The invention has been described above with the aid of an example of embodiment without limitation of the generality and the general applicability of the invention.

Thus, the basic concepts of the invention may of course be applied also to spectacle lenses which are intended for persons having a residual accommodation ability. A corresponding modification is possible at any time. The spectacle lens described above may of course be used also by persons having sufficient residual accommodation ability to see distinctly at close range through the reference point of the second see-through region designed for a distance of 1.3 meters.

Of course, the cases of use of the spectacle lens according to the invention, mentioned by way of example, represent no restriction of the general applicability.

In any case, the spectacle lens according to the invention is distinctive in having no widened near portion and no narrow region for viewing at intermediate distances, as with conventional spectacle lenses, but having instead a significantly larger region than in the case of prior art, through which the user of the spectacle lens can see distinctly at medium distances, i.e. distances of at least 1 m.

What is claimed is:

1. Spectacle lens,
   having in a first see-through region a power suitable for viewing at a far distance in a wearing position; and
   having in a second see-through region a power suitable for viewing at medium distances, i.e. for distances of about one meter and more in a wearing position; and
   in which the power continually increases from the first see-through region along a plane or winding principal line to the second see-through region;
   with the following features:
   the power increases not only from the first see-through region to the second see-through region, but also continuously beyond the second see-through region to a lower edge of the spectacle lens; and
   a region of clear vision, i.e. a region in which a residual astigmatism of a system-spectacle lens eye does not exceed 0.5 dpt, narrows below the first see-through region towards the lower edge of the spectacle lens to have a funnel-shaped configuration, i.e. without any constriction.

2. Spectacle lens according to claim 1,
   wherein only one surface contributes to the increase of the power in a wearing position.

3. Spectacle lens according to claim 2,
   wherein this surface is an eye-side surfaces.

4. Spectacle lens according to claim 3,
   wherein the other surface is a rotationally symmetrical or toroidal surface.

5. Spectacle lens according to claim 4,
   wherein for a non-astigmatic eye the region of clear vision is bounded by a 0.5 dpt isometric line of surface astigmatism.

6. Spectacle lens according to claim 5,
   wherein a course of a first derivative of the power along the principal line is monotonous between the first and the second see-through regions.

7. Spectacle lens according to claim 6,
   wherein the course of the first derivative of the power along the principal line is monotonous between the second see-through region and the lower edge of the spectacle lens.

8. Spectacle lens according to claim 7,
   wherein the spectacle lens has a same diameter as a conventional spectacle lens with progressive power, i.e. a spectacle lens with a region designed for distant viewing and a region designed for near viewing.

9. Spectacle lens according claim 8,
   wherein a surface or surfaces which contribute to an increase of power in the wearing position have been individually computed for a respective wearing situation.

10. Spectacle lens according to claim 9,
wherein isometric lines of a power increase extend horizontally in a region of a principal visual axis.

11. Spectacle lens according to claim 10,
wherein at least the isometric lines of power increase passing through the principal line above a center between points $B_F$ and "$B_N$" are curved upwards laterally of the principal line and meet the edge of the spectacle lens at a value of a y coordinate which is higher than a value of a y coordinate at which they pass through the principal line.

12. Spectacle lens according to claim 11,
wherein a distance reference point ($B_F$) and a centration point ($Z_P$) coincide.

13. Spectacle lens according to claim 1,
wherein the other surface is a rotationally symmetrical or toroidal surface.

14. Spectacle lens according to claim 1,
wherein for a non-astigmatic eye the region of clear vision is bounded by a 0.5 dpt isometric line of surface astigmatism.

15. Spectacle lens according to claim 1,
wherein the spectacle lens has a same diameter as a conventional spectacle lens with progressive power, i.e. a spectacle lens with a region designed for distant viewing and a region designed for near viewing.

16. Spectacle lens according claim 1,
wherein a surface or surfaces which contribute to an increase of power in the wearing position have been individually computed for a respective wearing situation.

17. Spectacle lens according to claim 1,
wherein isometric lines of a power increase extend horizontally in a region of a principal visual axis.

18. Spectacle lens according to claim 1,
wherein a distance reference point ($B_F$) and a centration point ($Z_P$) coincide.

19. A spectacle lens comprising:
a lower edge;
a first see-through region having a power suitable for viewing at a far distance in a wearing position;
a second see-through region having a power suitable for viewing at a medium distance of about one meter and more in a wearing position;
a plane or winding principal line, wherein power continually increases from the first see-through region along the plane or winding principal line to the second see-through region and beyond the second see-through region to the lower edge; and
a region of clear vision in which a residual astigmatism of a system spectacle-lens/eye does not exceed 0.5 dpt, wherein the region of clear vision narrows below the first see-through region towards the lower edge to have a funnel-shaped configuration without any constriction.

20. The spectacle lens according to claim 1, further comprising first and second surfaces, wherein only one of the first and second surfaces contributes to the increase of the power.

21. The spectacle lens according to claim 20,
wherein the one of the first and second surfaces is an eye-side surface.

22. The spectacle lens according to claim 21,
wherein the other surface is a rotationally symmetrical or toroidal surface.

23. The spectacle lens according to claim 20,
wherein the other surface is a rotationally symmetrical or toroidal surface.

24. The spectacle lens according to claim 23,
wherein for a non-astigmatic eye the region of clear vision is bounded by a 0.5 dpt isometric line of surface astigmatism.

25. The spectacle lens according to claim 24,
wherein a first derivative of the power along the principal line is monotonous between the first and the second see-through regions.

26. The spectacle lens according to claim 25,
wherein the first derivative of the power along the principal line is monotonous between the second see-through region and the lower edge of the spectacle lens.

27. The spectacle lens according to claim 24,
wherein a first derivative of the power along the principal line is monotonous between the second see-through region and the lower edge of the spectacle lens.

28. The spectacle lens according to claim 27, further having a diameter, wherein the diameter of the spectacle lens is the same as that of a spectacle lens with a region designed for distant viewing and a region designed for near viewing.

29. The spectacle lens according to claim 28,
wherein the surface which contributes to the increase of the power is individually computed for a specific wearing situation.

30. The spectacle lens according to claim 29, further comprising principal visual axis, wherein isometric lines of power increase extend horizontally in a region of the principal visual axis.

31. The spectacle lens according to claim 30,
wherein at least the isometric lines of power increase passing through the principal line above a center between points $B_F$ and $B_N$ are curved upwards laterally of the principal line and meet the edge of the spectacle lens at a value of a y coordinate which is higher than a value of a y coordinate at which they pass through the principal line.

32. The spectacle lens according to claim 31, further comprising a distance reference point ($B_F$) and a centration point ($Z_P$), wherein the distance reference point ($B_F$) and centration point ($Z_P$) coincide.

* * * * *